(12) United States Patent
Wabnegger et al.

(10) Patent No.: US 10,811,172 B2
(45) Date of Patent: Oct. 20, 2020

(54) METHOD AND APPARATUS FOR CONTINUOUSLY PROCESSING CONDUCTOR CABLE FOR DISPOSAL OR RECYCLING

(71) Applicant: QUANTA ASSOCIATES, LP, Houston, TX (US)

(72) Inventors: David Karl Wabnegger, Langley (CA); Robert Wayne Palmer, Houston, TX (US); Jody Milton Greer, Houston, TX (US); Michael Howard Boudreau, Salmon Arm (CA)

(73) Assignee: Quanta Associates, L.P., Houston, TX (US)

( * ) Notice: Subject to any disclaimer, the term of this patent is extended or adjusted under 35 U.S.C. 154(b) by 289 days.

(21) Appl. No.: 15/882,492

(22) Filed: Jan. 29, 2018

(65) Prior Publication Data

US 2018/0151273 A1 May 31, 2018

Related U.S. Application Data

(63) Continuation of application No. 14/664,774, filed on Mar. 20, 2015, now Pat. No. 9,881,718.

(60) Provisional application No. 61/968,535, filed on Mar. 21, 2014.

(51) Int. Cl.
*H01B 15/00* (2006.01)
*B21F 13/00* (2006.01)

(52) U.S. Cl.
CPC ........... *H01B 15/006* (2013.01); *B21F 13/00* (2013.01); *Y02W 30/821* (2015.05); *Y10T 83/0467* (2015.04); *Y10T 83/2074* (2015.04)

(58) Field of Classification Search
CPC .... H01B 15/006; B21F 13/00; Y02W 30/821; Y10T 83/2074; Y10T 83/0467
See application file for complete search history.

(56) References Cited

U.S. PATENT DOCUMENTS

| | | | | |
|---|---|---|---|---|
| 3,612,412 A | * | 10/1971 | Graveman | B21F 13/00 241/25 |
| 3,650,012 A | * | 3/1972 | Graveman | H01B 7/36 29/403.3 |
| 3,727,497 A | * | 4/1973 | Davis | H02G 1/1265 83/167 |
| 4,685,831 A | * | 8/1987 | Mahoney | H02G 1/08 254/134.3 SC |
| 4,711,133 A | * | 12/1987 | Berglund | G01L 5/08 73/862.07 |

(Continued)

*Primary Examiner* — Faye Francis
(74) *Attorney, Agent, or Firm* — Oathout Law Firm; Mark A. Oathout; Antony C. Edwards

(57) ABSTRACT

A continuous processing system and method for the continuous processing of an electrical conductor cable having aluminum strands encasing a steel core directly from a puller or from a puller and reel, simultaneously or on-the-fly during substantially the entirety of a reconductoring or re-stringing of the cable, wherein such cables are used for power lines or for static wires. The system is adapted to cooperate with a pulling machine. The pulling machine may be formed integrally within the system or may be a conventional pulling machine which cooperates with the system. The processing system runs continuously, substantially without interruption, during the pull of all of the cable from the pull zone of the reconductoring or restringing.

10 Claims, 12 Drawing Sheets

(56) References Cited

U.S. PATENT DOCUMENTS

| | | | | |
|---|---|---|---|---|
| 4,989,450 A | * | 2/1991 | Shoberg | G01L 5/10 |
| | | | | 73/1.15 |
| 5,060,683 A | * | 10/1991 | Seiz | C23G 3/021 |
| | | | | 134/113 |
| 5,710,432 A | * | 1/1998 | Bell | G01L 5/042 |
| | | | | 250/559.32 |

* cited by examiner

METHOD AND APPARATUS FOR CONTINUOUSLY PROCESSING CONDUCTOR CABLE FOR DISPOSAL OR RECYCLING

CROSS REFERENCE TO RELATED APPLICATIONS

This application is a continuation of U.S. patent application Ser. No. 14/664,774, filed on Mar. 20, 2015, now U.S. Pat. No. 9,881,718 granted on Jan. 30, 2018. U.S. patent application Ser. No. 14/664,774 in turn claims benefit of U.S. patent application Ser. No. 61/968,535 filed on Mar. 21, 2014. Entireties of all the patent applications stated in this paragraph are incorporated herein by reference.

BACKGROUND OF THE INVENTION

Applicant engages in reconductoring of high voltage power lines that is the replacing of the existing conductors or wires with new conductors or wires and the replacement of overhead static wire. During the execution of the reconductoring or restringing process, new conductor or the wire is often pulled into a position previously occupied by wire-being-replaced. The existing wire is positioned in dollies on the support structures, connected to the replacement wire and pulled out utilizing for example a v-groove puller. The v-groove puller provides the tension to pull the wire while also rolling up the wire-being-replaced up on a reel for disposal.

When the take-up reel for the v-groove puller is filled to capacity, the reconductoring or restringing process must be stopped. Typically, the old wire is removed from the take-up reel, banded together and placed in a dumpster for removal. During the time required to perform this change-out, productivity for the entire crew is stopped. Also, since the conductor is wound on a reel and disposed of in a coil, the recycling value is significantly lower since the exterior stranding material (typically aluminum) is not separated from the interior core material (typically steel).

It is known in a prior art as taught by Graveman in U.S. Pat. No. 3,612,412 (the "Graveman patent") which issued Oct. 12, 1971 for a Process and Apparatus for Recovering Metals from Cables, to separate metal components of cable, and in particular the aluminum strands wound about a steel core, by substantially cutting through the aluminum strands at closely spaced intervals while leaving the steel core intact. Graveman describes that this frees small aluminum strand segments from the core and that these segments may be processed further in a reduction mill. Graveman describes winding the core onto a roll after the aluminum segments are cut away from the core. The aluminum segments are formed from the aluminum strands by notched blades, sized to fit around the core, severing the aluminum strands into segments in an apparatus where the blades may be mounted onto revolving wheels. Graveman teaches that the cable, prior to having the aluminum strands segmented from the steel core, is stored on a roll, weighing up to approximately 2000 lbs and containing 6000 feet of cable, and that in many instances the rolls of cable are wound on large wood spools or drums.

Thus Graveman discloses the use of a horizontal turn table for supporting a roll of used cable, for example wound onto a spool or drum, wherein the turn table revolves about a vertical axis and has a flat upper surface on which the roll of cable rests. The turn table revolves as the cable is withdrawn from the roll and fed towards the wheels containing the aluminum strand severing blades.

The wheels containing the blades are counter-rotating and each revolves in a direction which causes the blades mounted on the wheels to present toward the turn table. Each blade meets a corresponding blade on the opposite wheel on a line of contact with the incoming cable. A cable guide aligns the line of contact of the incoming cable with the intersection of the wheels. In particular, the cable is passed through the guide and fed into arcuate grooves between the wheels so that, as the wheels revolve, the blades on the wheels engage the aluminum strands of cable and draw the entire cable through the cutting machine. As the wheels revolve, the cutting edges of the blades engage the aluminum strands so as to sever the strands, allowing the cable core to pass through between the revolving wheels and blades intact by means of the notches in the blades aligning around the core.

In addition to the use of the cutter wheels, the cutting machine includes a core stripper for dislodging any of the cut aluminum segments which may cling to the core as the core immerges from the groves of the cutter wheels. The core stripper includes a sleeve having a pulley at one end for engaging a drive belt from a separate motor so that the motor drives rotation of the sleeve. The opposite end of the sleeve, opposite from the pulley is fitted with a collar having an aperture sized to allow the passage of the core therethrough. The sleeve is aligned with the line of contact between the cutter wheels so that the cable passes through the collar bore and sleeve as the cable is played out from between the revolving wheels. A pair of generally radially extending stripper blades are mounted on the face of the collar facing towards the wheels so that as the core passes into the collar bore, the pair blades, which are rotating with rotation of the sleeve, revolve around the core and engage any cut segments of the aluminum strands clinging to the core, thereby dislodging those aluminum segments. The aluminum segments are propelled away from the core so that only the core emerges from the opposite end of the rotating sleeve. The core is pulled through the sleeve and rotating wheels by means of a motor that is necessary to rotate the take-up reel at the extreme downstream of aft end of the apparatus. The pulling machine maintains the cable taut between the cable stripper and the cutter wheels.

The Graveman patent is incorporated herein in its entirety by reference.

SUMMARY OF THE INVENTION

The present invention is a continuous processing system and method for the continuous processing of an electrical conductor cable having aluminum strands encasing a steel core directly from a puller or from a puller and reel, simultaneously or on-the-fly during substantially the entirety of a reconductoring or re-stringing of the cable, wherein such cables are used for power lines or for static wires. The system is adapted to cooperate with a pulling machine. The pulling machine may be formed integrally within the system or may be a conventional pulling machine which cooperates with the system. In order to avoid the disruption and downtime caused when using reels on which the exposed core is reeled until the reel is full, then requiring a swap-out of the reel, the processing system runs continuously, substantially without interruption, during the pull of all of the cable from the pull zone of the reconductoring or restringing.

The system may include at least a first cable guide. The cable guide is positioned, or positionable, so as to take the cable off the pulling machine at a take-off position, so as to engage and align the cable. The cable is pulled by a cable puller through the cable guide.

A first stage cutter is adapted to cut into a first layer or sleeve of strands of the cable, for example the aluminum strands covering a steel core of the cable (collectively referred to herein as cable strands). The first stage cutter is positioned in cooperation with the first cable guide. The puller drives the cable into the first stage cutter. The first stage cutter cuts the cable strands into pieces or segments, collectively referred to herein as segments. The segments which fall from the first stage cutter are removed from under the vicinity of the first stage cutter by the use of a removable bin, conveyor, cart, truck or other disposal device for recycling of the pieces or segments of the cable strands. A passive splitter head may be provided to strip any remaining segments adhered to the core of the cable. The core of the cable is then driven into a downstream core processor, such as a second stage cutter, which processes the cable simultaneously or on-the-fly so that the core may be removed for disposal or recycling without interrupting a continuous pull of the cable from the pull zone.

The downstream core processor is downstream of the first stage cutter, wherein the reference to a stream direction, as in upstream and downstream, is relative to the direction of travel of the cable. Where the downstream core processor includes a second stage cutter, the second stage cutter is adapted to cut the core of the cable into second segments. The cut second segments fall and are removed from the vicinity of the second stage cutter by a removable bin, conveyor or other disposal device for disposal or recycling of the cut second segments. The first and second stage cutters are driven, and may be powered by a motor such as for example, and without intending to be limiting a hydraulic or electric motor. The second stage cutter may be gear driven from the first stage cutter, or may be independently actuated, wherein the timing between the cutters and the tension on the cable is controlled, for example by gearing or a chain or belt or by sensors and feedback to a control system.

According to one aspect of the method then, during re-conductoring or re-stringing operations wherein cable is pulled from the pull zone of a power line or static line, the aluminum strands are cut and removed from the core of the cable on-the-fly or simultaneously with the reconductoring or re-stringing, and the core is processed, for example by cutting, also on-the-fly, to minimize or eliminate down time during a pull of all of the cable from the pull zone. Most advantageously the pull is continuous, substantially without interruption until the pull of the cable entirely from the pull zone is completed.

In further summary then, one aspect of the invention may be characterized as a method of continuously processing a cable-to-be-recycled pulled from a pull zone, wherein the cable-to-be-recycled has aluminum strands surrounding a core, and wherein the cable-to-be-recycled is pulled during a pull from the pull zone during reconductoring or re-stringing, and wherein the method includes the steps of:
  a) providing a cable puller at, at least, one end of the pull zone and pulling the cable-to-be-recycled from the pull zone using the puller,
  b) providing a first stage cutter and, simultaneously with and during substantially the entire pulling, feeding the cable-to-be-recycled from the puller into the first stage cutter, wherein the first stage cutter includes at least one pair of counter-rotating wheels having circumcising cutter blades positioned about the wheels so that the cutter blades close at a bight between the wheels so as to cut through the aluminum strands of the cable-to-be-recycled while leaving the core intact as the wheels rotate and the cable-to-be-recycled passes through the bight so as to expose the core,
  c) passing the core downstream from the first stage cutter and then continuously processing the core for disposal or recycling,
  d) continuing, substantially without interruption, the pulling during the pull until the pull of the cable-to-be-recycled is completed from the entirety of the pull zone during the reconductoring or restringing.

The step of continuously processing the core for disposal or recycling may include providing a downstream core processor such as a second stage cutter downstream of the first stage cutter, and processing the core through the downstream core processor so as to, for example, cut the core into segments.

A passive splitter head may be provided between the first cutter stage and the down-stream core processor. The core is fed from the first stage cutter into and through the passive splitter head to remove any of the segments of the aluminum strands which remain adhered to the core. The splitter head may for example be conical or wedge-shaped and include or form bores to snugly fit over the cable as the cable passes through its corresponding bore.

By way of example, the pull may be during a reconductoring wherein conductors being pulled are energized by inductance. Alternatively, by way of a second example, the pull may be during a restringing of static wire above energized conductors.

A multiplicity, for example three side-by-side pairs of counter-rotating cutting wheels may be provided so as to simultaneously process, for example three phases for the recycling of the aluminum strands or the aluminum strands and core, for each of the phases. As used herein, recycling is intended to include direct and indirect recycling, so as to include the disposal of the aluminum strands to a third party, for recycling of the aluminum strands by that third party.

A tensioner system may be provided to keep the cable-to-be-recycled substantially taut and fed into the first cutter stage. The tensioner system may include at least one non-contact sensor cooperating with the cable-to-be-recycled or the core therefrom. The tensioner system may include an encoder wheel and/or a second puller immediately upstream of the first stage cutter.

Another aspect of the invention may be characterized as an apparatus for continuous processing of a cable-to-be-recycled pulled from a pull zone, wherein the cable-to-be-recycled has aluminum strands surrounding a core, and wherein the cable- to-be-recycled is pulled during a pull from the pull zone by a puller during reconductoring or re-stringing. The apparatus may include a first stage cutter adapted to be fed the cable-to-be-recycled from the puller simultaneously with, and during, substantially the entire pull. The first stage cutter may include, but is not intended to be limited to, as other strand cutter/strippers will also work, at least one pair of the counter-rotating wheels having circumcising cutter blades positioned about the wheels so that the cutter blades close at a bight between the wheels so as to cut through the aluminum strands of the cable-to-be-recycled as the wheels rotate and the cable-to-be-recycled passes through the bight so as to expose the core intact. A downstream core processor, downstream of the first stage cutter, is adapted to continuously and simultaneously process the core from the first stage cutter for disposal or recycling of the core during the entirety of the pull of all of the cable-to-be-recycled from the pull zone.

The downstream core processor may include a second stage cutter adapted to be fed the core and to cut the core into segments. A passive splitter head may be provided which is adapted to be fed the core from the first stage cutter into and through the passive splitter head to remove any of the segments of the aluminum strands which remain adhered to the core. The passive splitter head may have for example a shape chosen from wedge-shaped or frusto-conical. The passive splitter head may be hollow so as to form a bore sized to be snug around the core at an upstream opening into the bore.

DETAILED DESCRIPTION OF EMBODIMENTS OF THE INVENTION

Figure 1:
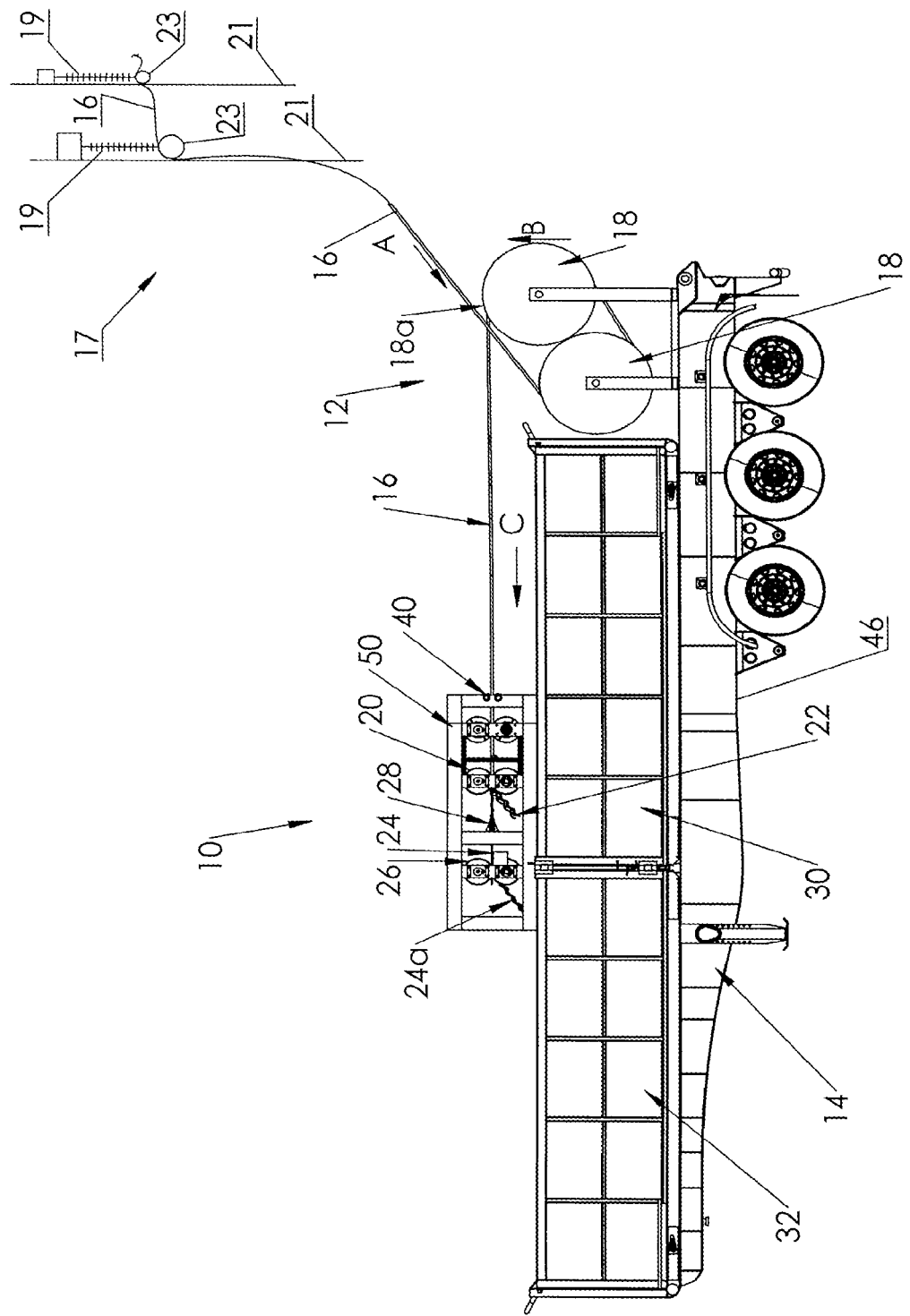
FIG. 1 is, in side elevation view, a cable processing system according to a first embodiment, wherein the system has an integrated puller for pulling the cable from the pull zone.

A system and method is provided to process the exterior stranding and the core from conductor cable or static wire. A processing machine simultaneously removes and separates the cable stranding from the cable core, while cutting the stranding into small pieces. A downstream core processor process the core for recycling. In one embodiment of the downstream core processor, the core is also cut into pieces. The downstream processing of the core, so as to allow its disposal or recycling as a continuous process not requiring any supply or any take-up (salvage) reels that must be swapped out, is important as it eliminates the need to stop mid-pull to unload a conventional salvage reel such as done in the past and such as envisioned in the prior art such as the Graveman patent described above wherein reels have to be changed. The processing enhances the recycling value of the cable, and greatly increases operational efficiency because the processing is continuous, unlike the Graveman patent described above. The cutting and salvage devices of the system may in one embodiment be attached to or mounted above easily removable and exchangeable bins of sufficient size to handle the amount of salvaged material required for the pull, or the bins may be standard sized bins for ease of removal or the bins may be attached to or mounted to a hopper or conveyor system, or may instead be removal bags. Removal trucks may be used so as to reduce or eliminate productivity bottlenecks such as resulting from a required stop mid-pull. It is important for the optimal usefulness of this invention that the processing be done simultaneously, that is, on-the-fly while the pulling of the cable-to-be-recycled from all of the pull zone is being done.

The recycling system may include an integral pulling system or may be provided as an add-on to existing cable pulling equipment such as V-groove pullers or bullwheel pullers. Depending upon the capabilities of the pulling system employed, the cutters in the recycling system may operate and be powered by one or more drive motors, such as hydraulic or electric drive motors. Advantageously the system includes a cable speed and/or tension sensor, such as for example a sag sensor which would cause the control system to automatically adjust operating speed to match the movement of the cable, and to cooperate with the drive motor so that the cable remains taut, such as at a predetermined tension. Timing and control may for example also be by way of gearing, chains or belts.

Cutting and separating the cable stranding from the cable core may for example be accomplished utilizing two sets of roller or wheel cutters having circumcising cutter blades thereon such as shown in the Graveman patent and/or described below. The rollers or wheels may for example be top and bottom rollers or wheels, and may be gear synchronized to ensure proper alignment of the cutter blades. A first stage of cutters may be so-called circumciser dies which cut the stranding into short pieces without severing the core, or only slightly scoring or cutting the core. Following, downstream of the first stage of cutters is a passive splitter head, such as a cone or wedge shaped splitter head, that passively strips the stranding from the core. The core is translated downstream, for example the core is pushed and/or pulled to a downstream core processer such as a second stage cutter in one embodiment of the downstream core processor wherein shear cutters mounted to a bank of rollers or wheels sever the core into small pieces. The cleaned core, free of stranding, may otherwise be processed continuously for disposal or recycling so as to allow the continuous, without interruption, pulling of the cable from the pull zone.

FIG. 1 illustrates a processing system 10 according to one aspect of the present disclosure wherein the system 10 has a pulling machine 12 integrated with it, mounted on trailer 14. Puller 12 pulls in direction A the existing cable 16 which is to be continuously processed (herein also referred to as the cable-to-be-recycled). Cable 16 is pulled from pull zone 17 by puller 12 in around reels, drums or wheels (herein collectively referred to as rotatable member 18), which rotate cable 16 in direction B. Cable 16 is pulled off the backside 18a of rotatable member 18 in direction C into the first stage of cutters 20 via first guide 40. Cable 16 is shown by way of example in FIG. 2, which depicts how cable 16 is constructed of a steel core 24 encased within a sleeve or wrapping, which may be a spiral wrapping, of aluminum stranding 22 having individual aluminum strands 8.

As described above, the first stage cutters 20 may include circumciser dies as would be known to one skilled in the art, or other forms of cutters/strippers to remove, and cut into pieces, the individual strands 8 of aluminum stranding 22 from the steel core 24, which may also be stranded, thereby allowing the exposed core 24 of cable 16 to be further processed downstream of the first stage cutters 20, for example by being cut into pieces by the second stage cutters 26 for removal. Wedge or cone-shaped passive splitter head 28 is mounted downstream of first stage cutters 20 to strip any adhered but severed aluminum stranding 22 from core 24 as core 24 travels forward and into cutters 26. Cutters 26 may for example be shear cutters as would also be known to those skilled in the art. Without intending to be limiting, as illustrated by way of example, the cut pieces of stranding 22 and those of core 24 (in the embodiment wherein the downstream core processor includes cutters 26) may be collected separately into corresponding bins 30 and 32 respectively. Once filled, bins 30 and 32 are swapped out for empty replacement bins, without stopping operation of the processing system 10. It may be that the bins are large enough to take a full pull of wire, as the cut pieces of wire take up less space in the bin. Thus downtime is significantly reduced, and preferably is eliminated using this method with processing system 10 as the processing continues simultaneously or on-the-fly and continuously during substantially the pulling of the cable 16, which is the entire cable-to-be-recycled from the pull zone 17.

Pull zone 17 may be multiple miles or kilometers in length with multiple miles or kilometers of cable 16 to process through processing system 10. Cable 16 may be suspended from insulators 19 attached to utility poles or supports 21 and traverse through a dolly 23, which may attach to insulator 19 or similar structure suitable for withstanding the loading during a pull of miles or kilometers of cable 16 through pull zone 17 and into rotatable member 18 of puller 12.

Figure 3:
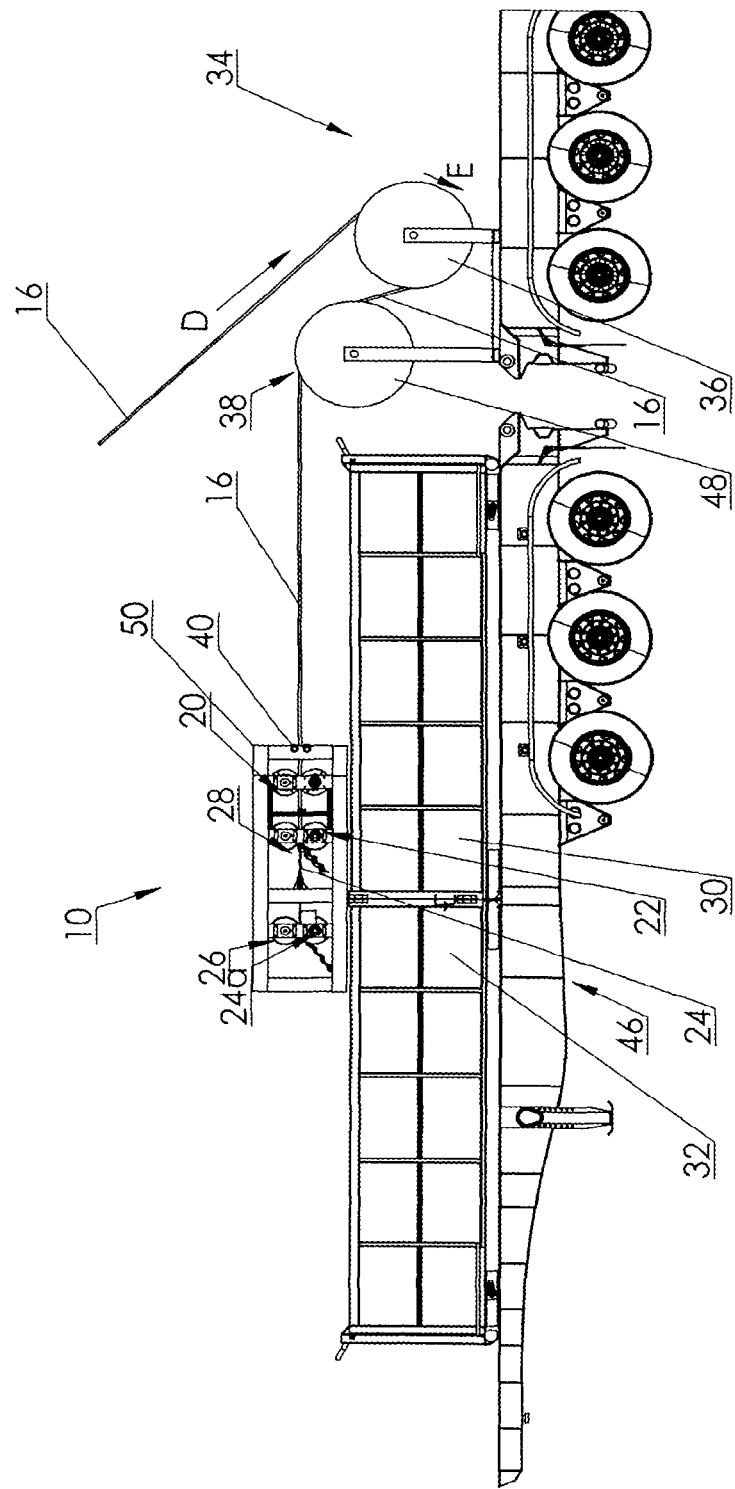
FIG. 3 is, in side elevation view, a cable processing system according to a second embodiment, wherein the system cooperates with an existing V-groove puller.

FIG. 3 illustrates a processing system 10 according to a second embodiment of the disclosure. Processing system 10 depicts a retro-fit to an existing or conventional pulling machine 34. Cable 16, from a pull zone 17 as depicted in FIG. 1, is pulled and reeled onto reel 36 in direction D so as to pass around reel 36 in direction E. Cable 16 is re-directed so as it is pulled off reels 36 and 48 at the backside cable take-off position 38. Cable 16 passes through guide 40 subsequent to take-off position 38. Cable guide 40 for example, may be mounted to frame 50, as depicted in FIG. 3, and/or instead to pulling machine 34 by a supporting structure (not shown). Cable guide 40 may be an active (moveable up and down for example) or passive (non-moveable in the up and down directions) guide, and may be static or rotatable, and may be short in length (measured in the direction of cable travel) or long, so long as sufficiently aligned between the puller, such as a v-grove or bullwheel puller, and the first cutter stage 20. One example of a cable guide for the processing system 10, may simply be fairleads 40' as depicted in FIG. 4.

Figure 5:
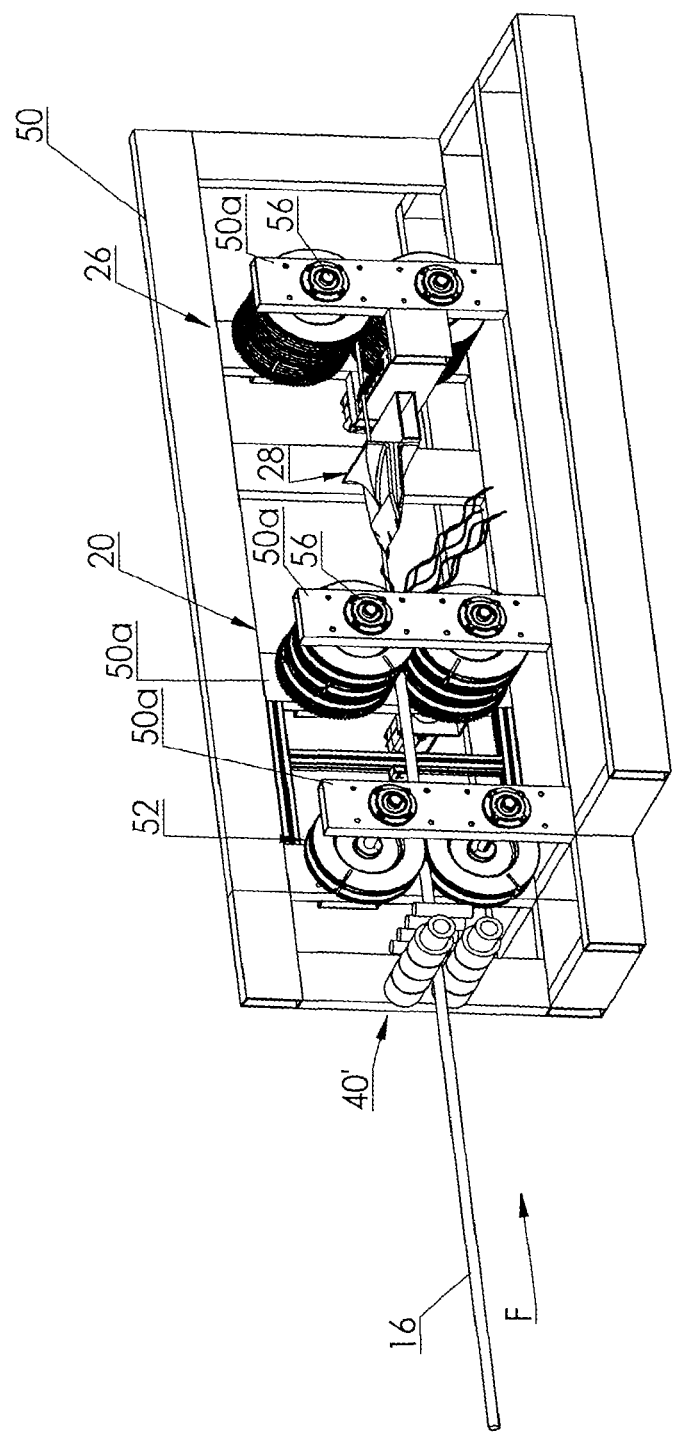
FIG. 5 is the view of the machine of FIG. 4 with the frame partially cut-away
Figure 6:
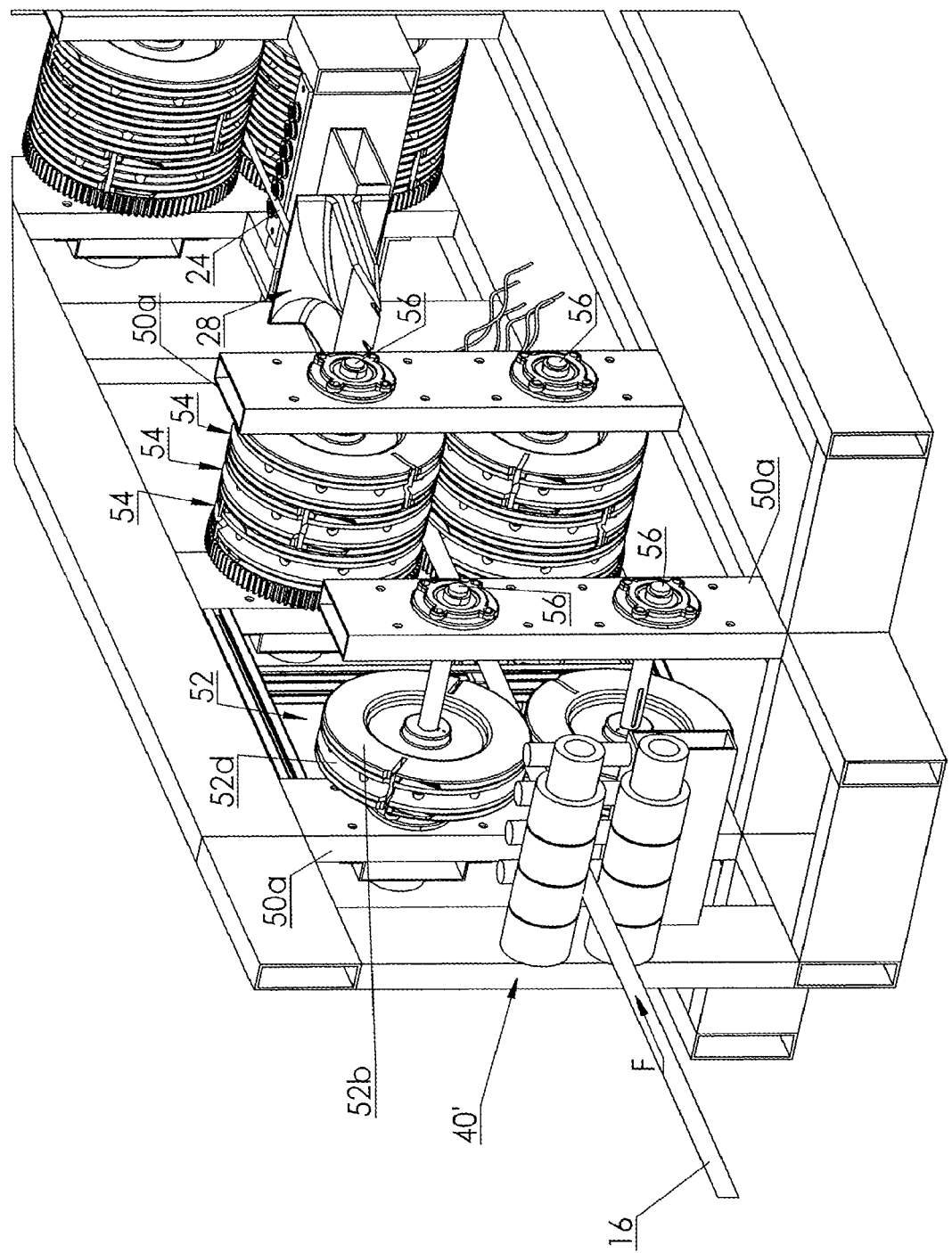
FIG. 6 is an enlarged view of the machine of FIG. 5.
Figure 7:
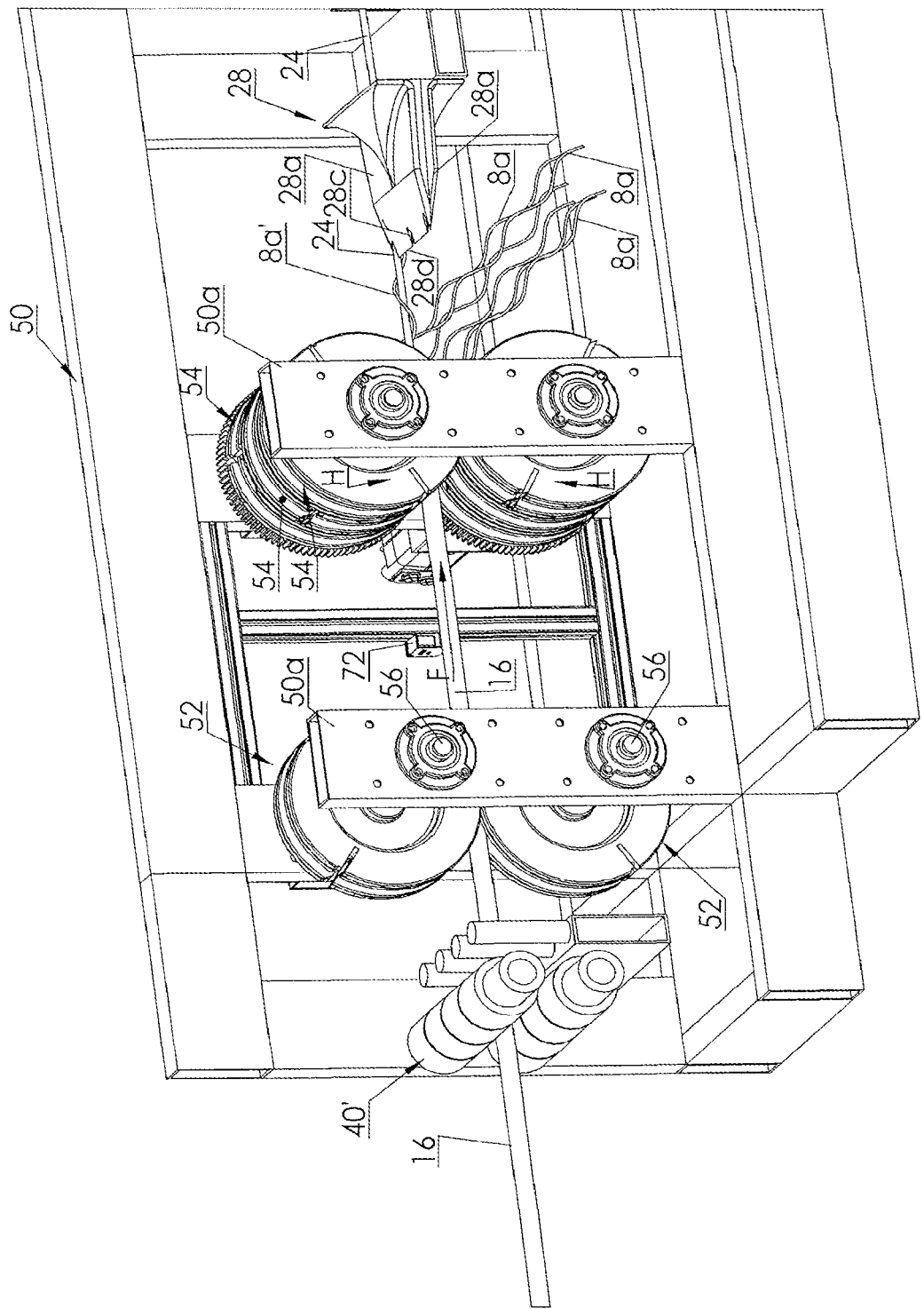
FIG. 7 is an enlarged view of the machine of FIG. 5 showing segmented aluminum strands falling from the first stage cutting wheels and adhered aluminum strands being removed from the cable core by the passive splitter head.

In FIGS. 4-12, cable 16 passes through cable guide 40' in direction F and into first stage cutter 20 as before. Individual strands 8 of stranding 22 is cut into pieces in first stage cutter 20 and removed by passive splitter head 28 as described above in respect of FIG. 1. As before, in an optional embodiment of the downstream core processor, core 24 passes through guide 68 and into second stage cutter 26 where the core is cut into pieces. FIG. 7 depicts how the severed segments 8a of strands 8 fall into bin 30 (FIGS. 1 and 3). The cut pieces 24a (FIG. 1) of core 24 fall into bin 32. Bins 30 and 32 may for example be mounted on trailer 46 in such a way so as to facilitate ease of removal of the full bins. For example, bins 30 and 32 may roll onto and off of trailer 46 using wheels (not shown), or slide on and off. The full bins are quickly replaced with empty bins so as to not impact productivity with any downtime whatsoever, or only that which might be necessary to change a bin or both bins 30 and 32, which is less time than would be necessary to change a take-up reel for example. Alternatively a large bin having a positionable wall (not shown) is positioned under the recycler machine in place of a trailer.

Delivery of cable 16 may be synchronized between wheels of pulling to machine 34, first stage cutter 20 and second stage cutter 26 to maintain control, direction and speed of the cable 16 to prevent sag, buckle, and jamming of the cable 16. Synchronization may be by way of gears, timing belt or chain, hydraulic circuit, electronic/digital control system, or other speed control and synchronization system known in the art.

Figure 4:
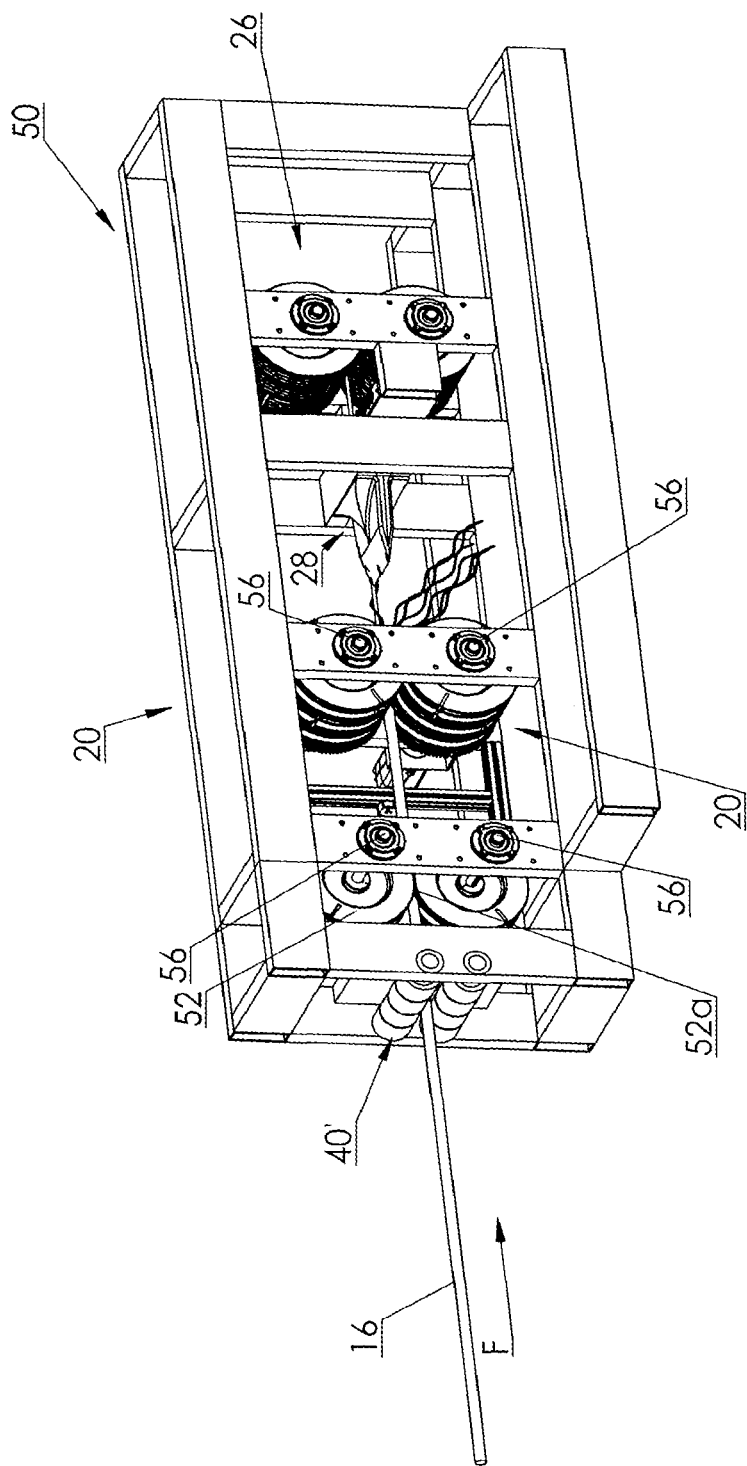
FIG. 4 is, in perspective view, a cable strand and core machine according to one embodiment having pulling wheels, a first stage cutter for segmenting aluminum strands from a cable, a passive splitter head for removing adhered segments of aluminum strands adhered to the core, and an optional second stage cutter for chopping the cable core into short lengths.

FIG. 4 illustrates the portion of system 10 located above bins 30 and 32. There as seen in FIG. 5, wherein a portion of the supporting frame 50 is removed, first and second stage cutters 20 and 26 are rotatively mounted and supported on axles 56 in the uprights 50a within frame 50

Figure 8:
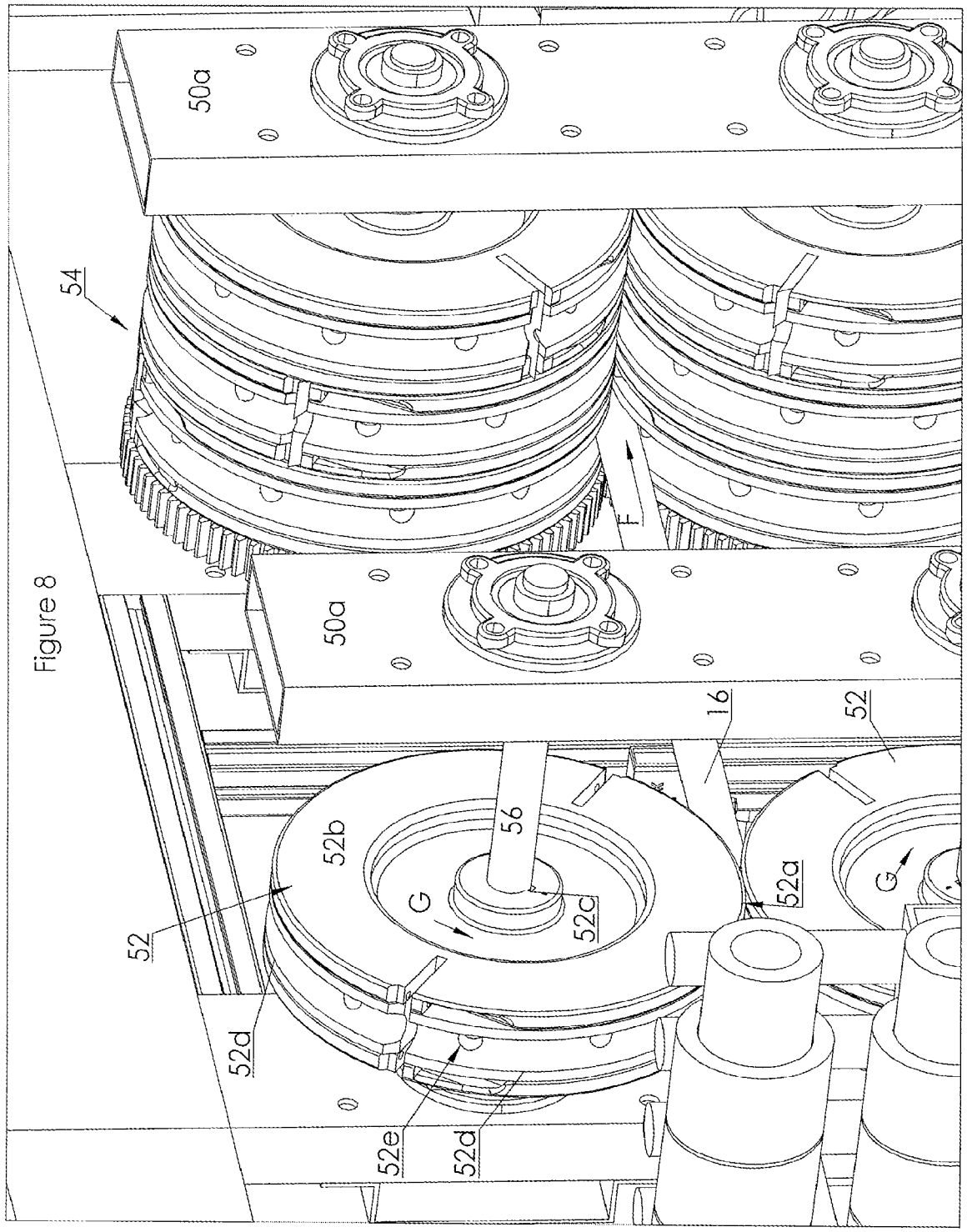
FIG. 8 is an enlarged view of FIG. 6.
Figure 11:
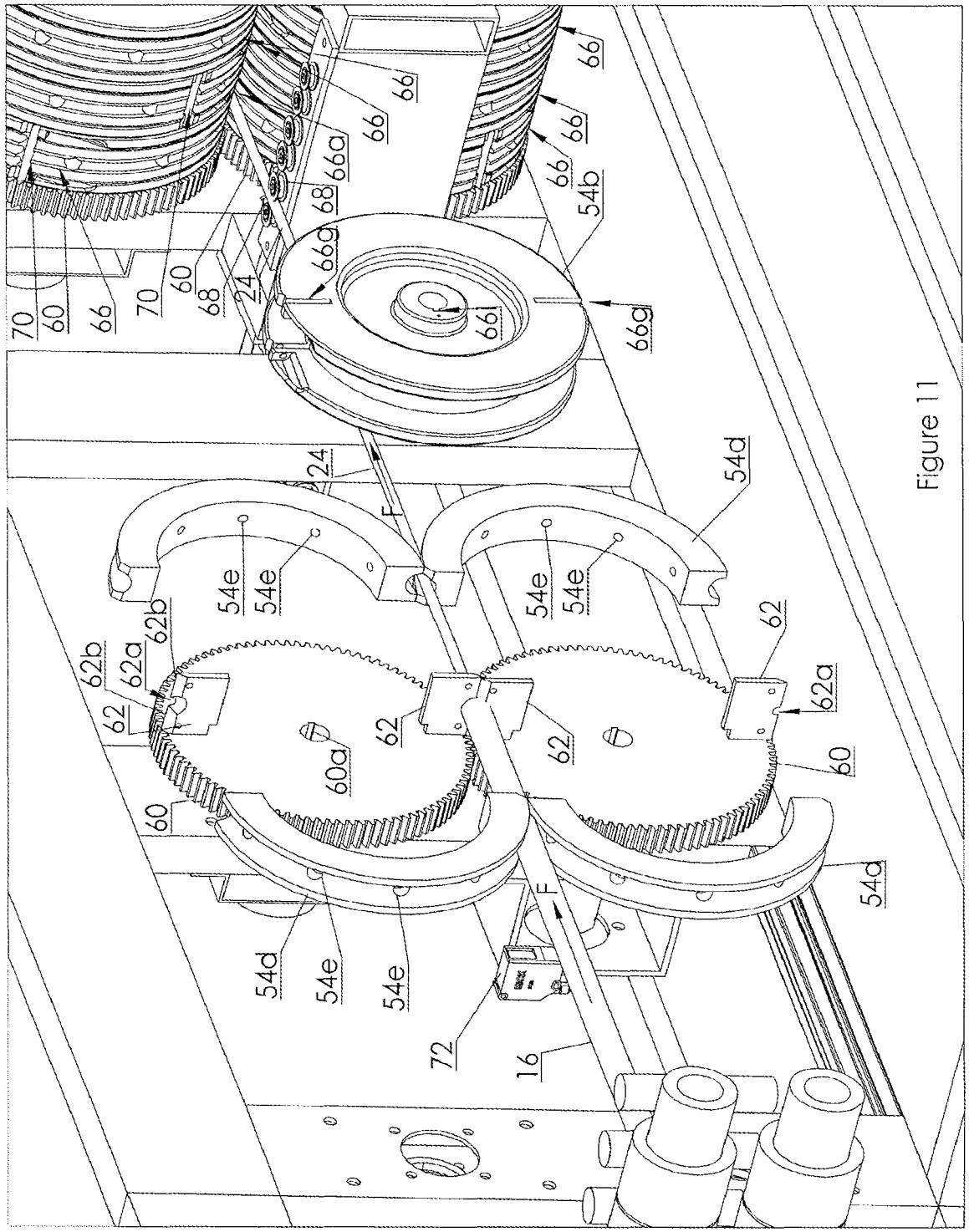
FIG. 11 is a further exploded, further partially cut-away view of FIG. 10.

Continuing with FIGS. 6-8, cable 16 travels from pulling machine 12 and into guides or fairleads 40' in direction F to align incoming cable 16 with the intersection of pulling or encoder wheels 52. The intersection of pulling or encoder wheels 52 forms a bight 52a between the wheels 52, so that cable 16 is engaged into bight 52a. Each wheel 52 includes a hub 52b mounted onto axle 56, keyed by way of keyway 52c for rotating with rotation of axle 56. Each encoder wheel 52 may be of similar design to the first stage cutting wheels 54 described below in greater detail. Encoder wheels 52 may provide encoding of the position and speed of travel of cable 16 for use by a control system used to synchronize and control the speed of encoder wheels 52, first stage cutting wheels 54, and second stage cutting wheels 66 (FIG. 11). Encoder wheels 52 may also, in alternative embodiments provide all or only some portion of the pulling force for cable 16 in direction F, although first stage cutting wheels 54 and second stage cutting wheels 66 are envisioned to also provide pulling force for cable 16.

Figure 9:
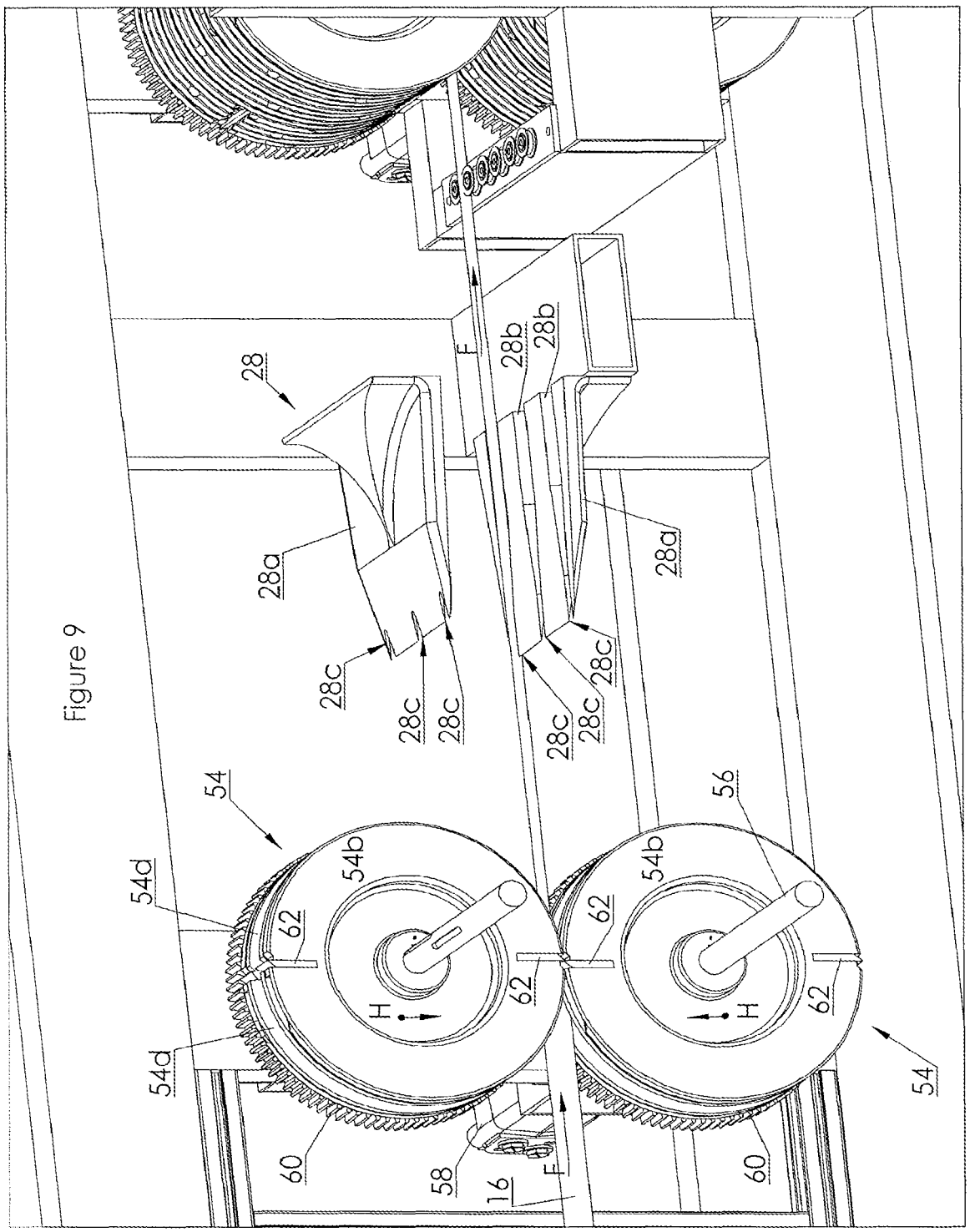
FIG. 9 is an enlarged, partially cut-away view of FIG. 7 showing the passive splitter head in a partially exploded view and two pairs of first stage cutting wheels removed.

As depicted in FIG. 8, hub 52b defines a first annular channel within which are mounted semi-circular liners 52d. Liners 52d are mounted into hub 52b, for example by means of bolts or screws through apertures 52e in the liners 52d, thereby bolting the liners to the hub. The liners 52d form a second annular channel around the hub. The second annular channel defined by liners 52d is semi-circular in cross section so that, at bight 52a, the opposite facing liners 52d form a circular passageway or opening which is sized to frictionally grip cable 16. With reference to FIGS. 8 and 9, encoder wheels 52 are rotated in direction G by frictionally tracking cable 16, thereby driving an encoder (not shown). Cable 16 is drawn by the first stage cutting wheels 54 through the fairleads 40' and into the first stage cutting wheels 54.

As depicted in FIG. 9, each pair of first stage cutting wheels 54 has a bight 54a formed therebetween when arranged in an upper and lower fashion. Each first stage cutting wheel 54 has a hub 54b which forms first annular channel within which are mounted semi-circular liners 54d, mounted to hubs 54b by means of bolts or screws through apertures 54e in liners 54d. The liners 54d, when mounted into hubs 54b themselves form a shallow second annular channel which is semi-circular in cross section so that, at bight 54a the opposite facing liners 54d define a circular passageway or opening that is sized to snuggly compress against cable 16 travelling therethrough in direction F.

First stage cutting wheels 54 each counter rotate in direction H. Thus the upper and lower wheels 54 in each pair counter-rotate to move the cable 16 in direction F. Cutting wheels 54 are mounted onto corresponding axles 56 using keyways 54c (FIG. 10) so that, as axles 56 are rotated, cutting wheels 54 are correspondingly rotated. Hydraulic motor 58 (FIG. 9) drives the lower axle 56, that is, the axle 56 engaging the lower first stage cutting wheel 54. Drive gears 60, also mounted on axles 56, transfer the driving torque from the lower axle 56 to the upper axle 56 of first stage cutting wheel thereby driving the corresponding one: one rotation of first stage cutting wheels 54.

Figure 10:
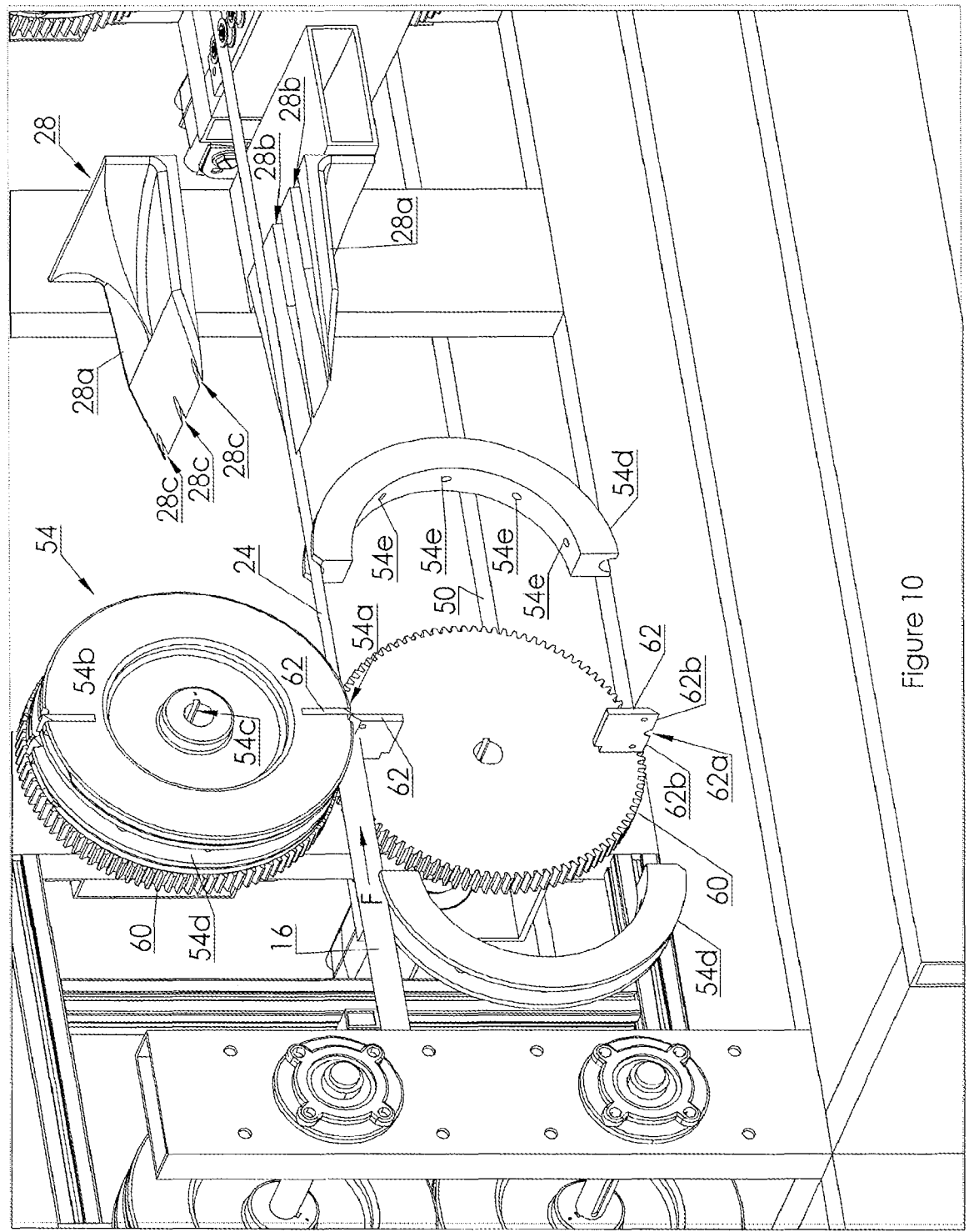
FIG. 10 is a further exploded, further partially cut-away view of FIG. 9.

With continued reference to FIG. 9, cutting blades 62, for example in the form of circumcising dies, are mounted in diametrically opposite orientations in hubs 54b, sandwiched between the ends of liners 54d, so as to engage the sheering faces of each cutting blade 62 in a sheering relationship at bight 54a as first stage cutting wheels 54 rotate. FIG. 10 depicts first stage cutting wheels 54 each having a notched cutting blade 62 with a notch 62a midway along each of the sheering edges 62b of each cutting blade 62. Notches 62a are sized so that, within bight 54a, the individual aluminum strands 8 are cut leaving the core 24 of cable 16 exposed, un-cut or relatively un-cut, and otherwise intact. The aluminum strands 8 are thus cut into segments 8a (FIG. 7) having a length approximately equal to one half of the circumference of each cutting wheel 54. Many of the severed strand segments 8a will fall from cable 16 as cable 16 passes through bight 54a, thereafter falling through frame 50 and into the underlying bin 30 (FIG. 1). However, some of the severed strand segments 8a will remain adhered to core 24, illustrated as segments 8a' (FIG. 7), thus requiring their removal from core 24 in order provide a clean steel core for single-metal recycling.

Figure 2:
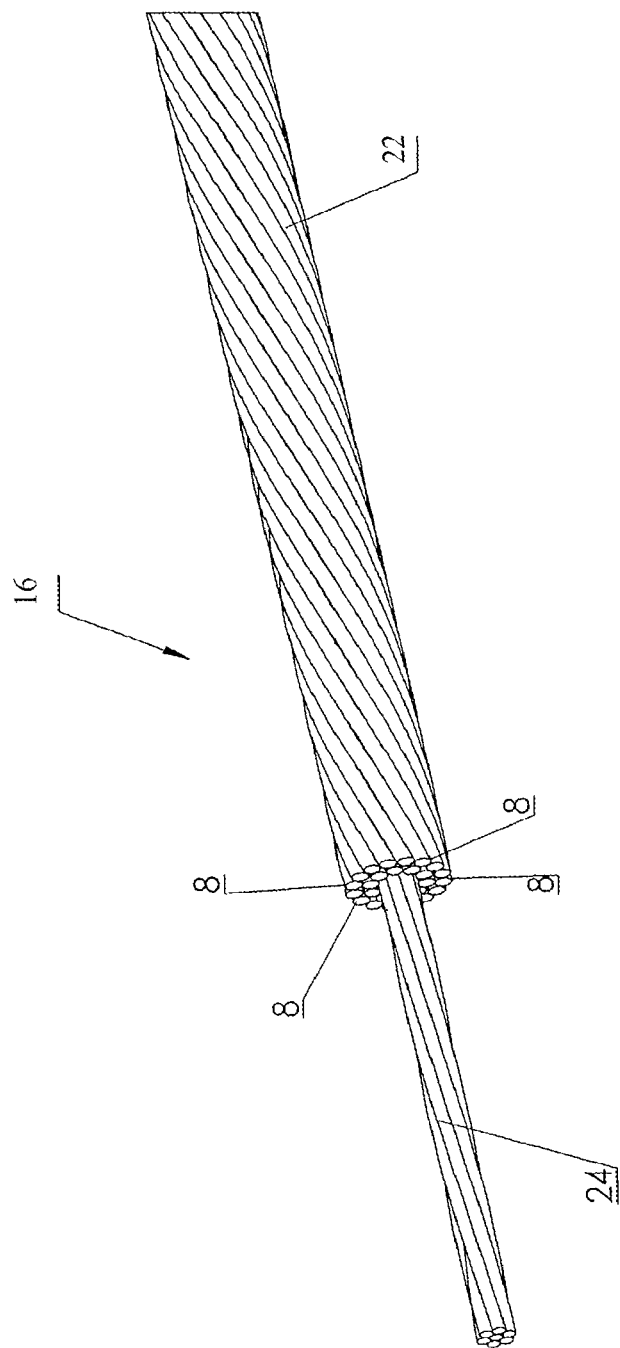
FIG. 2 is, in perspective partially cut-away view, a section of cable showing the aluminum strands and inner core.

Any adhered aluminum strand segments 8a' are removed by passive splitter head 28. In the example of FIGS. 1-3, the passive splitter head 28 is intended to be, and illustrated as having a frusto-conical shape. Core 24 is passed through the hollow bore of the cone of each head 28. In the example of FIGS. 4-12, the splitter head 28 is wedge-shaped. Both types of splitting head 28 are passive in the sense that they are not motorized for independently actuated scrapping of the core. As better seen in FIGS. 9 and 10, in the illustrated example, which is not intended to be limiting, the passive splitter head 28 is formed by two substantially mirror image plates 28a. Each plate 28a has a parallel array of channels 28b, each of which is parallel to the direction of travel of core 24. When the two mirror image plates 28a are mated to one another, each of the three parallel channels 28b form a tube through which a core 24 may be passed. In the example illustrated, each of the channels 28b, and therefore each of the corresponding tubes formed by the mating of the pair of plates 28a, slightly diverge from a small diameter opening 28c, which is sized to snuggly encircle the core 24. Three tubes are provided for on-the-fly recycling of three phases of conductor cable. It is intended that the number of tubes would be matched to the number of phases where there is a multiplicity of phases. When the adhered aluminum strands segments 8a' carried on core 24 in direction F engage against the leading edge 28d of the passive splitter head 28 as core 24 slides snuggly through openings 28c, the adhered strand segments 8a' are pealed, scraped or otherwise split off from where they are adhered to core 24. Once the leading edge 28d of the passive splitter head 28 disengages the adhered strand segments 8a' from core 24, the adhered strand segments 8a' are then free to fall through frame 50 and, like strand segments 8a, fall into the underlying bin.

Figure 12:
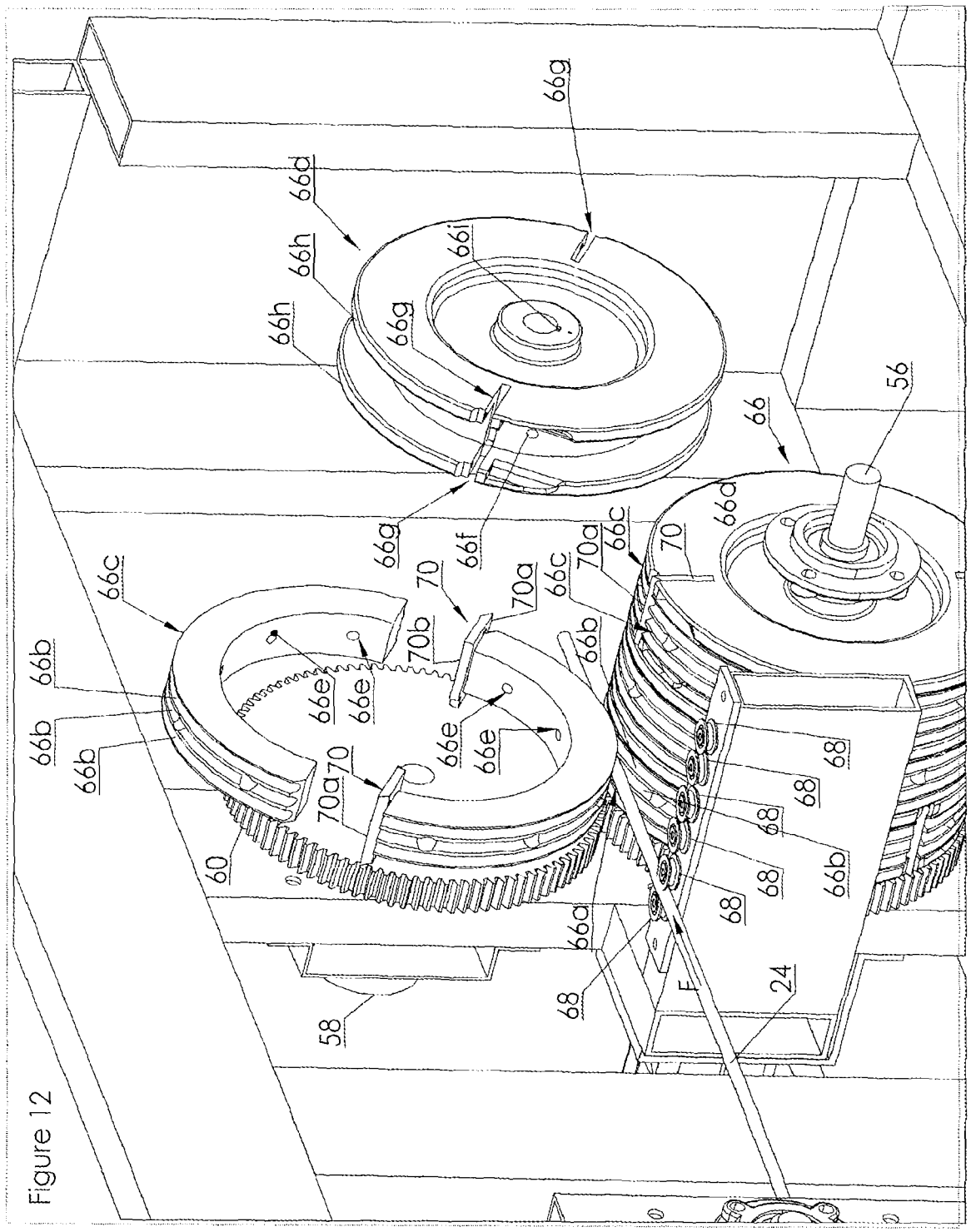
FIG. 12 is an enlarged perspective view of the optional second stage cutters in a partially exploded, partially cut-away view.

In the embodiment of the downstream core processor that includes second stage cutters 26, the cleaned core 24 then travels from the downstream end of the passive splitter head 28, through second stage guides 68 and into the bight 66a of second stage cutting wheels 66 as best seen in FIGS. 11 and 12. Once core 24 passes in direction F through passives splitter head 28, it passes through a pair of the adjacent guide rollers 68 into one of a plurality of annular channels 66b formed in wheel liner 66c. A pair of semi-circular liners 66c are mounted into hub 66d in the same manner that liners 54d are mounted into hub 54b of the first stage cutting wheels 54. Thus liners 66c are mounted into the annular channel of hub 66d by means of bolts or other fasteners through apertures 66e in liners 66c aligning with corresponding holes 66f around the rim of hub of 66d. Sheering or chopping blades are mounted into slots 66g formed in the parallel walls 66h of hub 66d so as to be sandwiched between the opposed facing ends of liners 66c.

As with first stage cutting wheels 54, a pair of intermeshed gears 60, one of which may be driven by a corresponding motor 58, drives the counter-rotating rotation of second stage cutter wheels 66 mounted on axles 56. Again, the wheel hubs 66d are mounted onto axles 56 and interlocked thereon by means of keyway 66i.

As with first stage cutting wheels 54, in the illustrated example which is not intended to be limiting, three adjacent pairs of upper and lower second stage cutting wheels 70 are mounted onto a corresponding vertically spaced apart pair of parallel axles 56. Thus the cable conductors from three phases, or such other number of phases being simultaneously pulled, that are pulled from a high voltage powerline structure may be continuously processed for recycling the aluminum strands simultaneously; one phase conductor through each of the first and corresponding second stage pairs of cutting wheels.

The reduced diameter of core 24, as compared to the diameter of cable 16, allows the use of multiple annular channels 66b in each cutting wheel liner 66c. This provides the operator the option of using any one of channels 66b. Thus, as the sheering blades 70 wear for a particular annular channel 66b, the operator may switch the alignment of core 24 into an adjacent pathway through guide rollers 68 to thereby direct core 24 into, for example, an adjacent annular channel 66b. This places core 24 into the path of a fresh cutting edge for each sheer blade 70. Thus in the example illustrated, three annular channels 66b are provided on a single pair of liners 66c, which will thereby extend the time between blade changes by a factor of three.

It will be understood that sheering blades 70 do not have to be notched in the manner of blades 62, but instead, may have a single linear cutting edge 70a running along the radially outer-most edge of the planar body 70b of each blade.

Sag detectors 72 may be mounted at one or more positions along frame 50 so as to monitor any sag in cable 16 or core 24. Sag may thus be used as an indicator of whether the motor speeds are matched to the speed of travel of the incoming cable. Rotary shaft encoders mounted on upper drive shafts 56 may be used to measure the rotational speed of each respective wheel set. Wheels 52 in the illustrated embodiment free wheel, thereby measuring the speed of passing cable 16. This forms part of the control signal used to drive the motors 58 on cutting wheels 20 and 26 matching the speed of all three, provided there is no cable sag detected by detector 72. Sag indicates a speed mismatch between wheel sets wherein the downstream wheel speed needs to be increased to eliminate the sag, thereby tensioning the cable. Over tensioning the cable is undesirable as it will cause lateral forces on the cutting blades.

While the above disclosure describes certain examples of the present invention, various modifications to the described examples will also be apparent to those skilled in the art. The scope of the claims should not be limited by the examples provided above; rather, the scope of the claims should be given the broadest interpretation that is consistent with the disclosure as a whole.

What is claimed is:

1. A method of continuously processing a cable-to-be-recycled simultaneously with being pulled from a pull zone during reconductoring or restringing so as to avoid storing the cable-to-be-recycled intact on a reel, wherein the cable-to-be-recycled has aluminum strands surrounding a core, the method comprising the steps of:
   a) providing a cable puller at, at least, one end of the pull zone and using the cable puller, pulling the cable-to-be-recycled from the pull zone for the duration of reconductoring or restringing,
   b) providing a strand cutter in proximity to the puller and, simultaneously with the pulling of the cable-to-be-recycled from the pull zone and continuously for the entire pulling of the cable-to-be-recycled from the pull zone for the duration of the reconductoring or restringing, feeding the cable-to-be-recycled from the puller into the strand cutter to cut the aluminum strands into strand segments without cutting the core so as to remove the strand segments from the core, wherein the strand cutter includes at least one blade to cut through the aluminum strands of the cable-to-be-recycled while leaving the core intact as the cable-to-be-recycled passes through the strand cutter,
   c) collecting, in proximity to the strand cutter, the strand segments removed from the core for recycling of the strand segments, and passing the core downstream from the strand cutter and then continuously processing the core for disposal or recycling,
   d) continuing, steps (a)-(c) until the pull of the cable-to-be-recycled is completed from the entirety of the pull zone to accomplish the reconductoring or restringing without interruption.

2. The method of claim 1 further comprising providing a core cutter downstream of the strand cutter and processing the core through the core cutter so as to cut the core into core segments.

3. The method of claim 2 further comprising providing a passive splitter head and feeding the core from the strand cutter into and through the passive splitter head to remove any of the strand segments of the aluminum strands which remain adhered to the core.

4. The method of claim 1 wherein the pull is during a reconductoring of powerline conductors.

5. The method of claim 1 wherein the pull is during a restringing of static wire.

6. The method of claim 3 wherein the passive splitter head has a shape chosen from: wedge-shaped, frusto-conical.

7. The method of claim 6 wherein the passive splitter head is hollow so as to form a bore sized to be snug around the core at an upstream opening into the bore.

8. The method of claim 1 further providing a tensioner system to keep the cable-to-be-recycled substantially taut and fed into the strand cutter.

9. The method of claim 8 wherein the tensioner system includes at least one non-contact sensor cooperating with the cable-to-be-recycled or the core therefrom.

10. The method of claim 8 wherein the tensioner system further comprises a second puller immediately upstream of the strand cutter.

* * * * *